United States Patent
Rademacher

(10) Patent No.: US 6,947,473 B1
(45) Date of Patent: Sep. 20, 2005

(54) RECEIVER AND METHOD OF RECOVERING DATA FROM RADIO SIGNALS

(75) Inventor: Leo Rademacher, Holzkirchen (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/763,287

(22) PCT Filed: Aug. 3, 1999

(86) PCT No.: PCT/EP99/05632

§ 371 (c)(1),
(2), (4) Date: Jun. 11, 2001

(87) PCT Pub. No.: WO00/13334

PCT Pub. Date: Mar. 9, 2000

(30) Foreign Application Priority Data

Aug. 28, 1998 (EP) .................................. 98116318

(51) Int. Cl.[7] .............................................. H04B 1/707
(52) U.S. Cl. ...................................... 375/148; 455/134
(58) Field of Search ................................ 375/144, 147, 375/148, 260, 267, 347, 349; 370/335, 342; 455/67.13, 132, 134, 135

(56) References Cited

U.S. PATENT DOCUMENTS 5,341,395 A * 8/1994 Bi .............................. 370/342
5,490,165 A   2/1996 Blakeney, II et al.
5,764,630 A * 6/1998 Natali et al. ................ 370/320
5,799,004 A * 8/1998 Keskitalo et al. ........... 370/335
5,886,987 A * 3/1999 Yoshida et al. ............. 370/318
5,930,288 A * 7/1999 Eberhardt ................... 375/148
5,953,369 A * 9/1999 Suzuki ....................... 375/148

FOREIGN PATENT DOCUMENTS

EP          0 491 688        6/1995
WO          WO 95/22209      8/1995

OTHER PUBLICATIONS

Fawer et al., *IEEE Transactions on Communications* 43:1556-1565, 1995.

* cited by examiner

*Primary Examiner*—Young T. Tse
(74) *Attorney, Agent, or Firm*—Fish & Richardson P.C.

(57) ABSTRACT

A receiver recovers data for at least one of a plurality of users from radio signals generated by the plurality of users. The receiver includes data detectors, each of which is associated with one of a plurality of temporal displacements in communications paths through which the radio signals pass. Each of the data detectors estimates a user data symbol for one of the plurality of users from at least one of the radio signals. The receiver also includes a signal strength estimator to estimate signal strengths of the radio signals, and a receiver controller to assign user codes and the temporal displacements to each the plurality of data detectors according to the signal strengths of the radio signals. The receiver controller assigns a first user code for a first user to a first number of data detectors and a second user code for a second user to a second number of data detectors. The first number of data detectors has different temporal displacements than the second number of data detectors.

20 Claims, 5 Drawing Sheets

RECEIVER AND METHOD OF RECOVERING DATA FROM RADIO SIGNALS

FIELD OF THE INVENTION

The present invention relates to receivers which operate to recover data for at least one of a plurality of users from contemporaneously detected like modulated radio signals. Furthermore the present invention relates to a method of recovering data for at least one of the plurality of users from contemporaneously detected like modulated radio signals. More specifically the present invention relates to radio receivers for recovering data from radio signals modulated in accordance with code division multiple access.

BACKGROUND

Data is communicated using code division multiple access systems by combining the data with a user specific spreading code and conveying the combination using radio signals which are transmitted between a transmitter and a receiver. At the receiver, the data is recovered from the radio signals by comparing the received radio signals with the user specific spreading code which is known to the receiver. In this way, a plurality of transmitters associated with a corresponding plurality of users may be arranged to contemporaneously communicate data from the transmitters to receivers which detect the data by comparing the radio signals with the unique user specific spreading code associated with each of the users.

A result of combining the data with a user specific spreading code, is that a bandwidth of the resulting radio signals is greater than that which would be the case if the data were carried alone by the radio signals. As a result, the frequency bandwidth occupied by code division multiple access signals is greater than a coherence bandwidth of the radio communications channel through which the signals pass. As a result code division multiple access signals are provided with an advantageous effect in that the signals themselves exhibit frequency diversity in that parts of the signals are communicated in frequencies which suffer fading independently.

Code division multiple access is used in both second and is now being proposed for third generation mobile radio telephone systems. A characteristic of a frequency bandwidth in which radio signals are transmitted in second and third generation mobile radio telephone systems, is that the radio signals arrive at receivers of the system via multiple paths. As a result, the received signals exhibit inter symbol interference which must be cancelled in order for the data to be recovered. A further advantage of code division multiple access, is that the increased bandwidth of the radio signals allows for each of the paths via which the radio signals reach the receiver to be individually determined and the radio signal energy for each of the paths to be recovered and combined to facilitate detection of the communicated data. A receiver which operates to effect the detection of individual paths via which radio signals reach the receiver is known to those skilled in the art as the rake receiver.

One known rake receiver which operates to combine conventional rake reception techniques with multi-user detection is described in a published article entitled 'A multi-user receiver for code division multiple access communications over multipath channels', by U. Fawer and B. Aazhang published in IEEE Transactions on Communications, Vol. 43, No. 2/3/4, February/March/April 1995 at pages 1556–1565. This known receiver is provided with a plurality of data detectors known as rake fingers which together form a rake receiver. Each of the fingers of the rake receiver are assigned to one of the plurality of users and one of a plurality of temporal displacements corresponding to one of a plurality of paths via which the radio signals reach the receiver. Furthermore the disclosed receiver is provided with a multi-user data detector which is fed with symbols detected by each of the rake fingers and serves to effect an iterative process from which data from each of the individual users is recovered by treating the detected symbols as either wanted data which is therefore recovered by the iterative process or interfering symbols which are arranged to be cancelled from the wanted data.

Rake receivers for code division multiple access radio signals suffer from multiple access interference, which is generated from other unwanted radio signals and may be described for the detection of each symbol individually by a cross-correlation between radio signals for different users during one symbol period before a symbol estimate is generated by each of the rake fingers. Furthermore interference is also caused in each of the rake fingers from radio signals reaching the receiver via other paths from the same user which have different temporal displacements which do not correspond with the temporal positions at which each rake finger is recovering the data from the radio signals. As such, self inter symbol interference is caused which may be described for the detection of each symbol individually by the auto-correlation of the radio signals for a specific user with a time shift equal to the difference in the temporal displacement between that operated by the rake finger and other interfering paths during one symbol period before the rake finger recovers an estimate of the symbol.

In EP 0491668A and WO 95/22209 CDMA demodulators are described which decode the received composite signal in the order of strongest to weakest signal strength. The number of decoder elements or data detectors is the same for every user spreading code.

SUMMARY

It is an object of the present invention to provide an improved rake receiver which is arranged to substantially reduce the effects of self inter symbol interference and multiple access interference, to improve a probability of correctly estimating the data symbols.

The invention resides generally in a rake receiver having a plurality of data detectors each of which is arranged to recover data symbols from radio signals at a particular temporal displacement and for a particular user specific code and by dynamically assigning the data detectors between a plurality of temporal displacements and user specific codes independence upon a relative signal strength of the radio signals associated with each of the users.

According to the present invention there is provided a receiver for recovering data for at least one of a plurality of users from contemporaneously detected like modulated radio signals generated by the users from user data in combination with a plurality of user specific codes, the receiver comprising a plurality of data detector means each of which is operatively associated with one of the plurality of the user specific codes and one of a plurality temporal displacements with respect to an impulse response of a communications channel through which the radio signals have passed, each of the data detector means operating to estimate symbols of the data for one of the users from the received radio signals in combination with the user specific spreading code and the temporal displacement, a signal strength estimation means which operates to determine a relative strength of the received radio signals from which each of the user data symbols was estimated by the data detectors, and a receiver controller which operates to assign the user codes and the temporal displacements to each of the data detectors, wherein the receiver controller operates to re-assign the plurality of spreading codes and the temporal displacements to the data detectors consequent upon the relative strength of the radio signals, thereby facilitating recovery of data symbols for the at least one user.

Known rake receivers are arranged to the effect that a plurality of the data detectors are distributed equally amongst a plurality of users so that an equal number of data detectors are provided to each user. The data detectors assigned to each user are arranged to generate an estimate of a transmitted symbol from radio signals received at a particular temporal displacement. As a result of the fact that radio signals from some users will be received with a substantially higher signal strength than radio signals received from other users, data symbols transmitted by users with strong signals will be more easily detected than symbols from users with relatively weaker radio signals. This situation is known to those skilled in the art as the 'near/far' problem. As such, users with weaker radio signals suffer most from multiple access interference and self inter symbol interference. However by determining the relative strengths of the received radio signals after a first estimate of the data symbols represented by the radio signals and subsequently reassigning the plurality of data detectors to the effect that users with weaker radio signals are arranged to be provided with a greater number of the data detectors, the radio receiver is arranged to provide an improvement in the probability of correctly estimating the data symbols from all users. The symbols estimated from users having stronger radio signals are in any case not disadvantaged by this reassignment since users with stronger signals do not suffer as greatly from inter symbol interference or multiple access interference from the weaker radio signals.

Advantageously the signal strength estimator means further operates to estimate the strength of components of the radio signals received at different temporal displacements, and the receiver controller further operates to reassign the plurality of data detectors in accordance with the relative strength of the signals.

Advantageously the radio receiver may further comprise a signal regenerator means coupled to the data detector means and arranged to regenerate received radio signals associated with at least one of the users by combining the estimated user data symbols with one of the plurality of user specific codes in dependence upon one of the temporal displacements.

The data detectors may further include means for subtracting the regenerated signals fed thereto from the received signals prior to the estimation of the user data symbols from a result of the subtraction.

By regenerating an estimate of the radio signals from particular users, and subtracting these radio signals from the received radio signals, the effect of stronger interfering signals may be cancelled from the radio signals from which data symbols from users with weaker radio signals may be subsequently estimated. As such, the assignment of the data detectors to the effect of generating an estimate of data symbols from users with relatively stronger signals is arranged to the effect that more of the data detectors are assigned to users with stronger radio signals. During a first iteration of the detection process, the data symbols from the stronger users are estimated and subsequently regenerated and subtracted from the received radio signals. Thereafter the plurality of data detectors are assigned to the weaker radio signals and the data symbols from these weaker users estimated from the result of subtracting the regenerated signals from the received radio signals. As such a different assignment strategy is exercised when the data detector includes a regenerator for subtracting the effect of users with stronger radio signals from the received signals.

The radio receiver may include a combiner means which operates to combine each of the estimates of the data symbols associated with a user to generate a composite data symbol decision. The combiner means may be a joint detector means which operates to cancel contemporaneously detected data symbols from the composite symbol decision to recover the data associated with one user.

The data detector means may be a rake finger and the users specific codes may be spreading codes the radio signals from the plurality of users being generated in accordance with code division multiple access.

According to a further aspect of the present invention there is provided a method of recovering data for at least one of a plurality of users from contemporaneously detected like modulated radio signals generated from user data and a plurality of user specific codes, the method comprising the steps of processing the radio signals with a plurality of data detector means so as to estimate data symbols associated with a plurality of the users at a plurality of temporal displacements with respect to an impulse response of a communications channel through which the received signals have passed, determining a relative strength of the radio signals from which each of the user data symbols were estimated and re-assigning the user specific codes and temporal displacements to the plurality of data detectors for at least one of the users in dependence upon the relative signal strengths of the radio signals.

One embodiment of the present invention will now be described, by way of example only, with reference to the accompanying drawings wherein;

DETAILED DESCRIPTION

The example embodiment of the present invention will be illustrated with reference to a mobile radio telecommunications system, and in particular to a mobile radio communications system which operates in accordance with code division multiple access (CDMA). CDMA has been selected by the European Telecommunications Standards Institute (ETSI) as the radio access technique for a third generation mobile telecommunication system known as the Universal Mobile Telecommunications System (UMTS). For a paired band, in frequency division duplex mode, the ETSI UMTS standard is arranged to operate in accordance with a wide band CDMA technique and in an unpaired band, in time division duplex mode, the radio access technique is a Time Division/CDMA multiple access technique. The present invention finds application with both W-CDMA and TD/CDMA technique.

Figure 1:
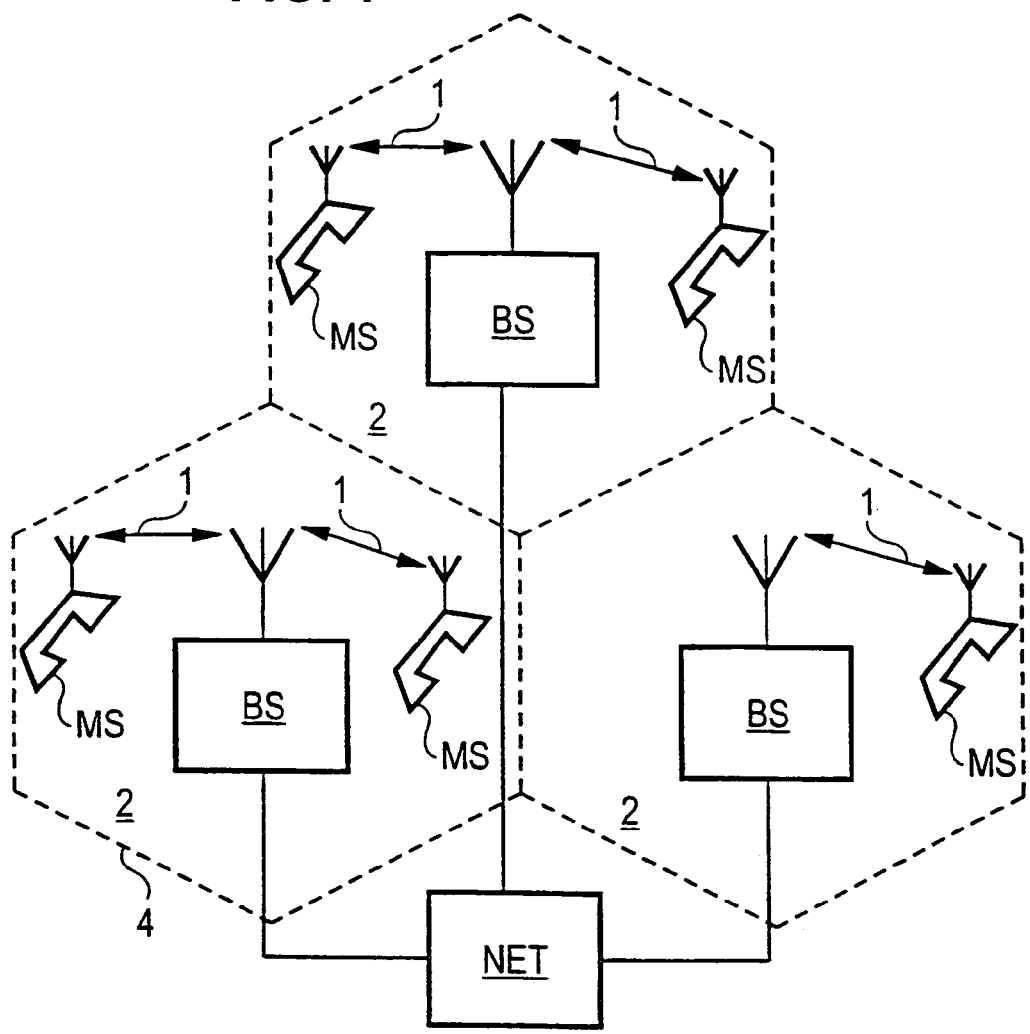
FIG. 1 is a schematic block diagram of a mobile radio telecommunication system.

An illustrative example of a mobile radio telecommunication system is illustrated in FIG. 1. In FIG. 1 a plurality of mobile stations MS, are shown to communicate using radio signals 1, transmitted between the mobile stations MS and a plurality of base stations BS. The base stations BS are disposed in a spaced part relationship so as provide a radio coverage area which may be conceived to be made up from a number of cells 2. A cell 2 is defined as a geographical area within which radio communications may be effected with a base station BS as supposed to any of the other base stations BS in a mobile radio network. In FIG. 1 the cells 2, formed for each of the three base stations BS illustrated are defined by the broken line 4. The mobile stations MS communicate data with each of the base stations BS using radio signals 1.

Data is communicated between the base station BS and mobile stations MS by combining the data with a user specific spreading code and then modulating the result onto a radio frequency carrier. A characteristic of CDMA radio access is that mobile stations MS are arranged to communicate radio signals contemporaneously to the base stations BS which operate to recover data symbols communicated by the mobile stations by de-spreading the received radio signals with a user specific spreading code. At the receivers in the respective base and mobile stations, the received radio signals are de-spread, by correlating the radio signals with respect to the user specific spreading sequence to the effect that the data symbols communicated are recovered in spite of the presence of contemporaneously detected CDMA signals from other mobile stations. Each of the mobile stations MS may be considered to be a user of the system, and as such, the term 'user' will be used in the following description to identify signals or data to be communicated from a particular source to a particular sink.

Figure 2:
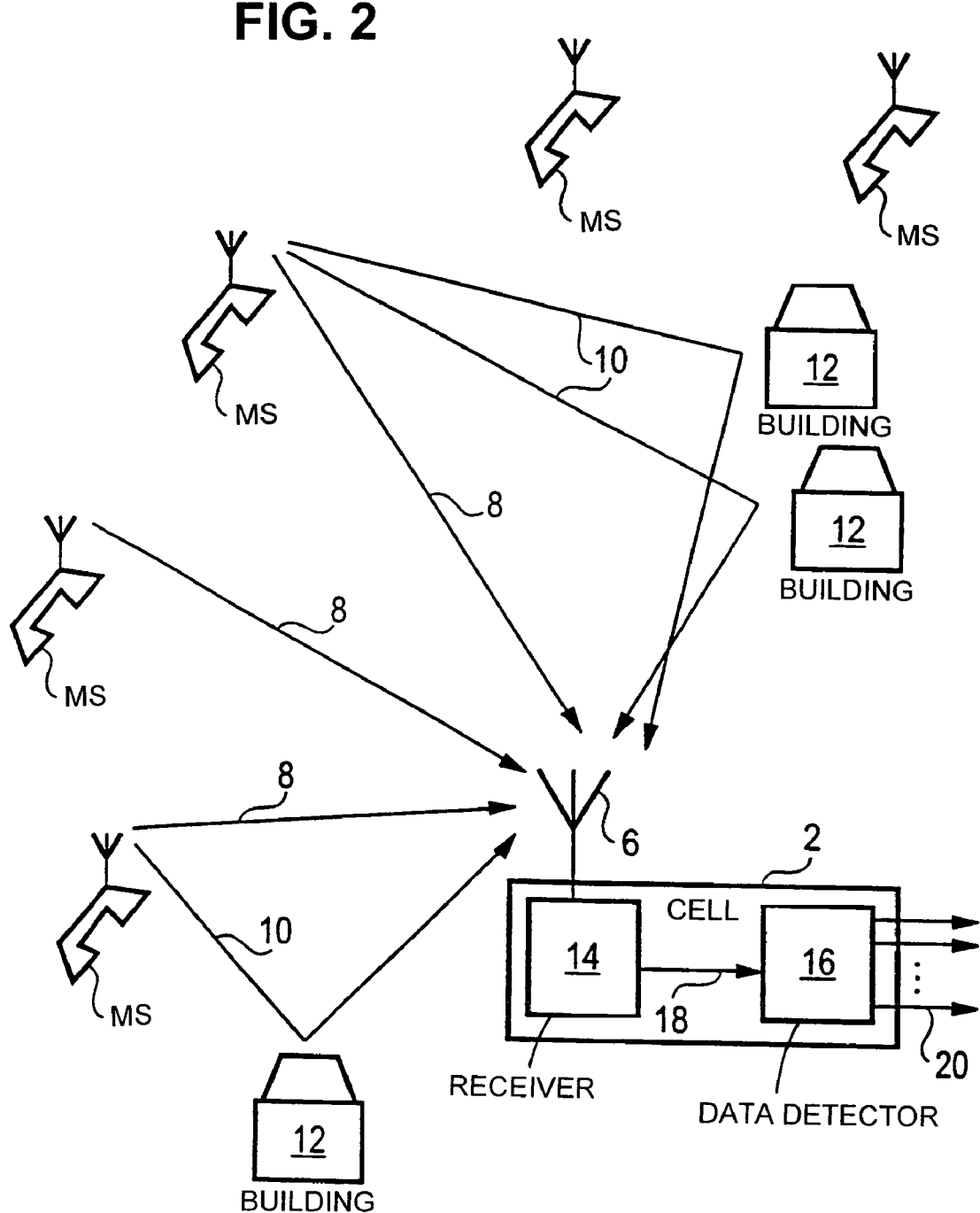
FIG. 2 is a schematic illustration of the propagation of radio signals from the mobile stations shown in FIG. 1 to one of the base stations shown in FIG. 1.

An illustration of the communication of CDMA signals between the mobile stations MS and one of the base stations BS shown in FIG. 1 is illustrated in FIG. 2 where parts also appearing in FIG. 1 bear identical numerical designations. In FIG. 2 a plurality of mobile stations are shown to communicate radio signals contemporaneously with the base station BS. A characteristic of the transmission of radio signals within a bandwidth which has been assigned to mobile radio communication systems is that the radio signals reach the receive antenna via a plurality of paths. This is illustrated in FIG. 2 by the lines 8, 10, which reach a receive antenna 6 of the base station BS via a direct path 8, and at least one additional path 10, which is reflected via an object such as a building 12. As a result of the multi-path propagation of the radio signals, the data communicated by the radio signals will exhibit inter symbol interference in a case where a temporal difference in the time taken for the radio signals to reach the receive antenna 6, via at least two paths is greater than a symbol period. As such mobile radio communication systems must be provided with means to mitigate the effect of inter symbol interference.

As illustrated in FIG. 2 the base station BS detects the received radio signals via the receive antenna 6 and communicates the detected radio signals to a front-end receiver 14. The front-end receiver 14 operates to down-convert and analogue to digital convert the received radio signals and feed the base band digital samples to a data detector 16 via a conductor 18. The data detector 16, operates to recover and separate the data symbols communicated by the radio signals transmitted by each of the mobile stations contemporaneously and pass the separated detected user data symbols to the mobile radio network for further processing via conductors 20.

Figure 3:
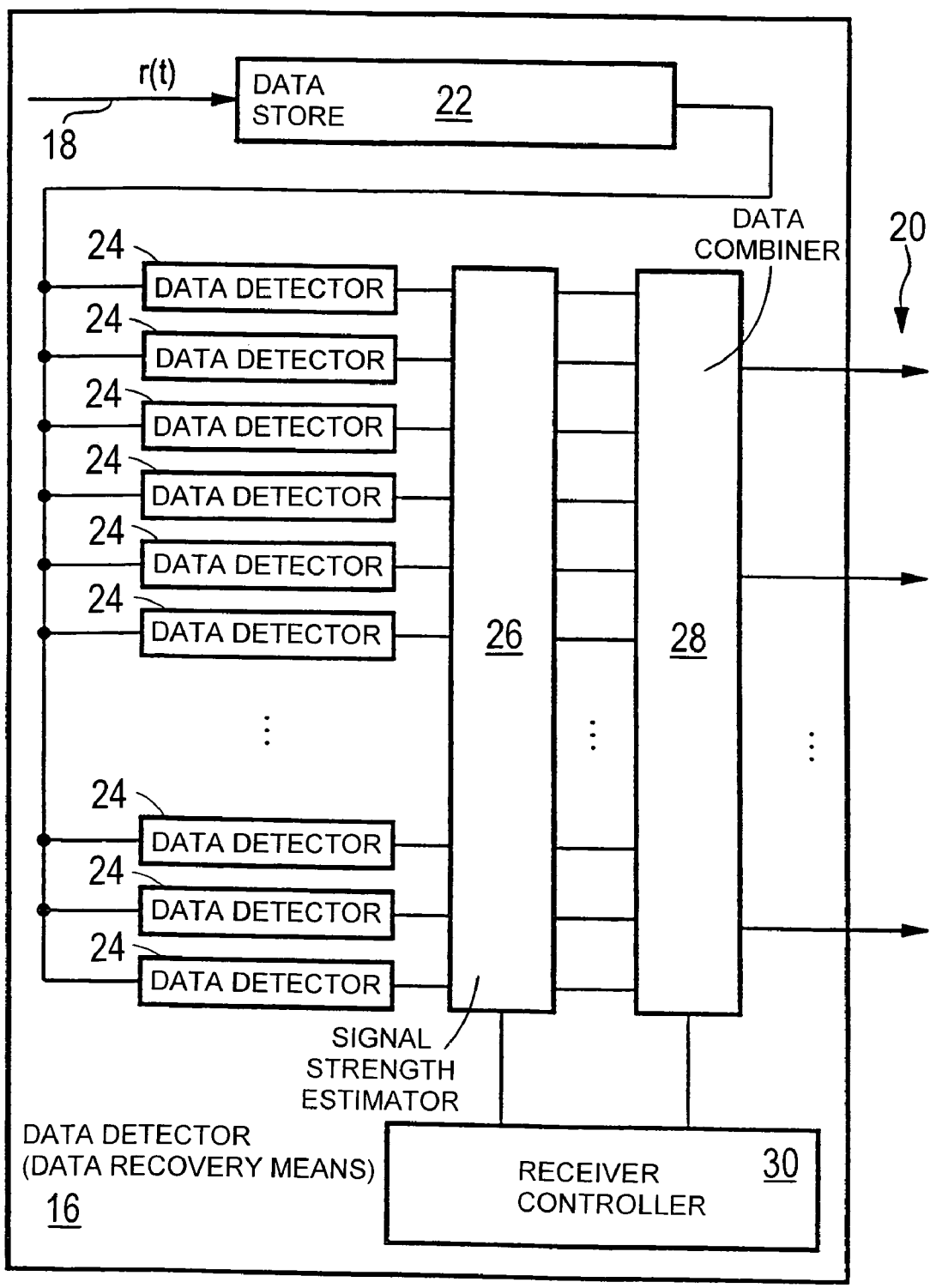
FIG. 3 is a schematic block diagram of a receiver embodied in one of the base stations shown in FIGS. 1 and 2.

An illustrative embodiment of the data recovery means 16 shown in FIG. 2 is illustrated in FIG. 3, where parts also appearing in FIG. 2 bear identical numerical designations. The data recovery means 16 is shown to be comprised of a data store 22 to which the received sampled base band signals are fed via conductor 18. An output of the data store 22, is fed to each of a plurality of data detectors 24. The outputs of each of the data detectors 24, are fed to a signal strength estimator means 26, and further to a data combiner means 28. The output of the data combiner means 28, is presented on a plurality of conductors 20, and corresponds to the recovered data symbols associated with each of the users. Coupled to the signal strength estimator means 26, and the combiner means 28, is a receiver controller 30. The operation of the data recovery means 16 will now be described with reference to CDMA signals.

The received digital samples representative of the detected radio signals are first fed from conductor 18, to the data store 22. These received signal samples correspond to a burst of radio signals of predetermined duration and having a predetermined number of user data symbols. In the following description it is assumed that the receiver has already been provided with means for synchronization with this predetermined burst of radio signals. The received signal samples are fed to each of the data detectors 24, which in the case of CDMA signals are representative of fingers of a rake receiver. Thus, each of the data detectors 24, is a rake finger and together the data detectors 24, form a rake receiver. Assigned to each of the rake fingers 24, is a user specific spreading sequence and one of a plurality of temporal displacements with respect to an impulse response of a communications channel through which the radio signals have passed.

As is familiar to those skilled in the art, a rake receiver comprises a number of rake fingers, each of which is arranged to correlate the received radio signals against the user specific spreading sequence and to sum the result of the correlation in order determine an estimate of the transmitted data symbol. Furthermore, each of the fingers of the rake is temporarily positioned to the effect of cross-correlating the user specific spreading code at a particular relative temporal position within a channel impulse response which describes the radio communications channel through which the received signals have passed. Thus, in the case of the present example where the radio signals have reached the receive antenna via a plurality of paths, an optimum rake receiver will arrange for the fingers of the rake to correlate at temporal positions corresponding to the respective delays experienced by the radio signals at each of the plurality of paths.

At a first iteration, the plurality of rake fingers are equally assigned to the corresponding numbers of users, to the effect that each user is assigned in the present example three rake fingers. Each of these fingers is temporarily positioned to the effect of recovering energy of the received radio signals at a particular temporal displacement matched to the impulse response of the channel through which the received signals have passed. The rake fingers thereafter generate an estimate of the user data symbols at the output which is fed to the signal strength estimator means 26. The signal strength estimator means 26 serves to provide a measure indicative of the relative strength or confidence in the estimated data symbol for each of the estimated data symbols determined by the corresponding rake fingers. The estimated data symbols and the estimate of the signal strength are thereafter fed to the combiner means 28, which serves to combine each of the estimated data symbols associated with each of the users so that for each user a composite data symbol is generated and output on the conductors 20. However under control of the receiver controller 30 users which are found to have a relatively weak signal strength by the signal strength estimator means 26, may be further estimated by adapting the assignment of the rake fingers 24, to the effect that the users with relatively weak radio signals are assigned more of the rake fingers 24, than users having relatively strong signals. Thus for users which have already been determined to have a relatively strong signal strength the already detected data symbol for these users may be output on the conductors 20. However, for the relatively weak radio signals the receiver controller 30 operates to once again feed the stored burst or radio signals from the data store 22, to the rake fingers 24, and to correspondingly reassign the rake fingers to the effect that more of the rake fingers 24, are arranged to correlate the received radio signal against the user specific sequence corresponding to users with relatively weak signal strengths. Furthermore, in correspondence with the channel impulse response determined for the user with a relatively weak signal strength, the relative temporal positions of the rake fingers 24, are reassigned, so that the delays of the rake fingers correspond to the paths by which the radio signal from the weak user reached the receiver. As such, the rake fingers are distributed in accordance with the channel impulse response experienced by the radio signals for this user with the effect that each of the rake fingers is assigned to a temporal position corresponding to a relatively significant component of the channel impulse response. With this further iteration the combiner means 28, receives from each of the rake fingers assigned to a particular user an estimate of the data symbol of that user which is therefore combined by the combiner means 28 to form the composite user data symbol which is output on a corresponding one of the conductors 20.

An example of a receiver which would operate in accordance with the data recovery means 16 as described, is provided in the aforementioned published article in the IEEE Transactions on Communications, Vol. 43, No. 2/3/4, February/March/April 1995 at page 1556 by U. Fawer at al. This known data recovery means is an illustration of an iterative data detector for recovering data from CDMA modulated signals in which fingers of the rake are assigned equally to each of the users, and for which corresponding estimates of data symbols are generated. Further iterations of the process are effected in accordance with the signal strength of the received signals to the effect that the data symbols for each user are estimated by cancelling from the received radio signals the effect of the radio signals from the other users. Thus, in the present example embodiment the signal strength estimator 26, and combiner means 28, could be formed by a single processor under control of the receiver controller 30.

Figure 4:
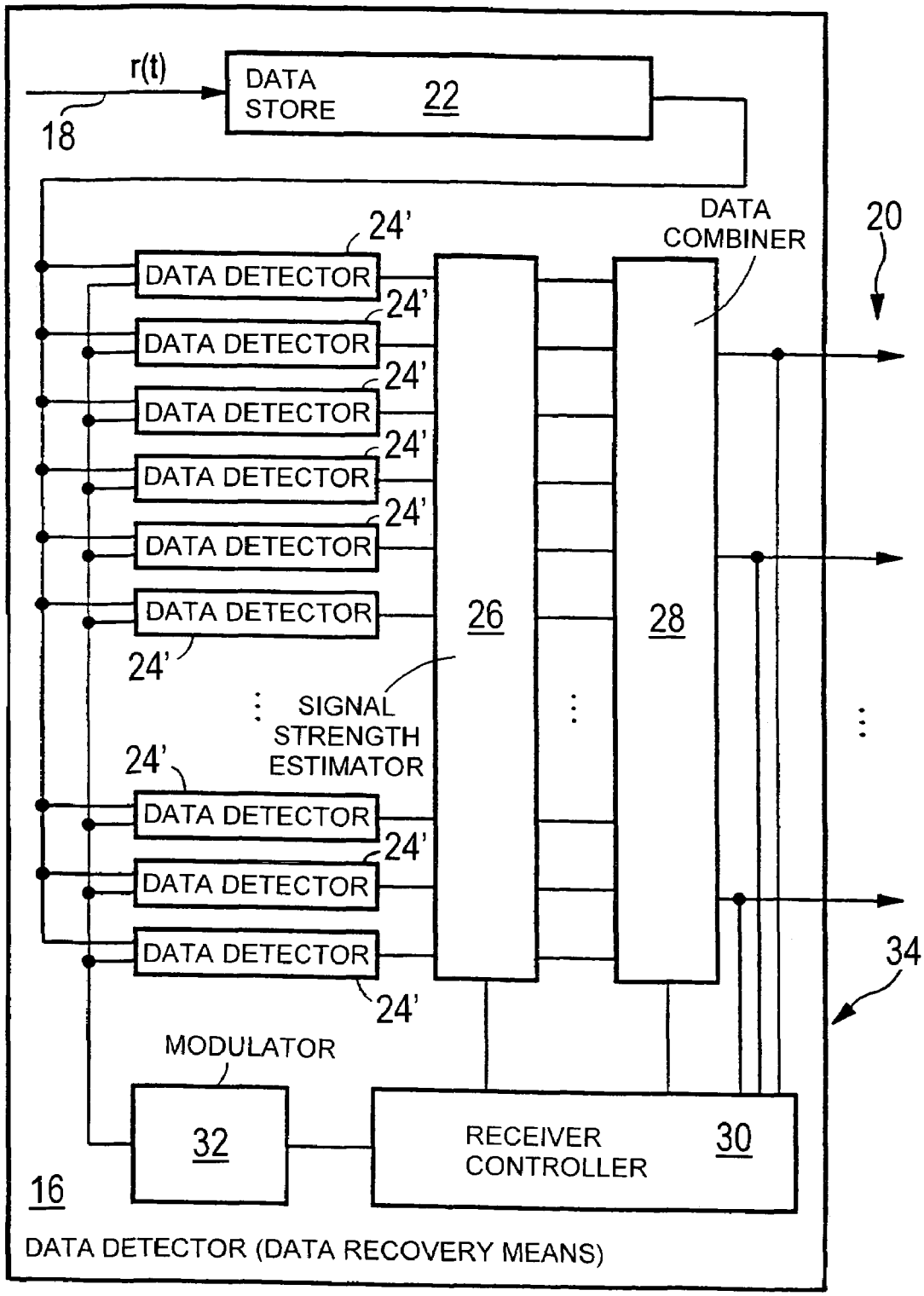
FIG. 4 is a schematic block diagram of a further receiver embodied within one of the base stations shown in FIGS. 1 and 2.

A further example embodiment of the present invention is provided in FIG. 4 where parts also appearing in FIGS. 2 and 3 bear identical numerical designations. In FIG. 4 a data recovery means 16 corresponds generally to the data recovery means shown in FIG. 3. However the data recovery means 16 shown in FIG. 4 is further arranged to feed back symbol decisions determined from first iterations of the detection process and to regenerate the effect of the radio signals in accordance with the estimated data, and to subtract the effect of these regenerated signals from the received signals in subsequent iterations of the detection process. In FIG. 4 the burst of received radio signals is again fed from the data store 22, to each of the rake fingers designated 24'. Also fed to the input of the rake fingers 24' are regenerated signals fed from a modulator 32 under control of the receiver controller 30. Estimates of the data symbols for each user as formed from the composite signal decisions made by the combining means 28, and are fed via the conductors 20, to the receiver controller 30 by conductors 34. The operation of the data recovery means 16 shown in FIG. 4 is substantially in accordance with that shown in FIG. 3. However the signal strength estimator means 26 on a first calculation of the estimated data symbols is used to identify the relative strength of the radio signals associated with each user as for the case with the data recovery means 16 shown in FIG. 3. However for the data recovery means 16 shown in FIG. 4, users with relatively strong radio signals are arranged to be assigned a greater share of the rake fingers 24' to the effect that the data symbol estimates associated with the relatively strong users are estimated and formed by the combiner means 28 and fed to the modulator 32 via the receiver controller 30. Thereafter the modulator means 32 operates to regenerate the radio signals formed by these users which are therefore fed back to the rake fingers 24'.

Figure 5:
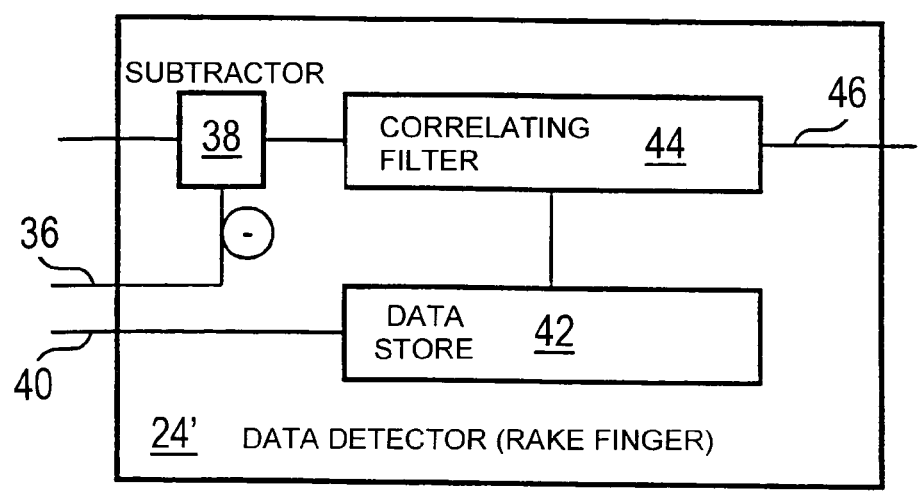
FIG. 5 is a schematic block diagram of a rake finger.

An illustrative example of such a rake finger 24' is shown in FIG. 5 where parts also appearing in FIG. 4 bear identical numerical designations. In FIG. 5 the regenerated radio signals are fed via a conductor 36 to a signal subtractor means 38. Also fed from the receiver controller 30, on a conductor 40, is a control signal fed to a data store 42. The control signal fed on conductor 40, serves to select which of the user specific sequences stored in a data store 42, is fed to a correlating filter means 44. In operation therefore in a subsequent iteration of the detection process, regenerated signals fed on conductor 36 are subtracted from the radio signals stored in data store 22 as they are fed to the rake fingers 24' by the subtraction means 38. The correlating filter 44 thereafter operates to correlate the subtracted received radio signals against the user specific sequence fed from the data store 42, and to form a symbol decision at the output of the correlating filter 44, representative of an estimate of the communicated data symbol associated with this user. The estimates of the data symbols are thereafter fed from the rake fingers 24' to the combiner means 28 via the signal strength estimator 26. The combiner means then operates to form a composite symbol decision presented on the output conductors 20. Thus, unlike the data recovery means 16 shown in FIG. 3 the effect of providing the modulator 32 under control of the receiver controller 30 and means for subtracting regenerated signals from the received signals serves to change the detection process of the data symbols from each user. For the data recovery means 16 shown in FIG. 4, in a first iteration, users with relatively strong signals are assigned more of the rake fingers 24' to the effect that a strong estimate of the data symbols for these users is generated which is thereafter used to regenerate the radio signals corresponding to these estimated data symbols. On a subsequent iteration the rake fingers 24' are assigned to the next weakest users and the effect of the already detected user data symbols is subtracted from the received signals to the effect that the rake fingers assigned to the next weakest user signals and distributed amongst the most significant signal components serve to provide a better estimate of the data symbols of the next weakest users. Thereafter, further iterations of the detection process are introduced with the data symbols from the users already detected being used to form the regenerated radio signals which are subtracted from the radio signals stored in the data store 22 to the effect that the weaker users may be detected using the rake fingers reassigned to them for the subsequent iteration. After all data symbols from all users have been estimated, a further burst of radio signals is fed to the data store 22 and the detection process is reiterated.

As an illustration, the following simple assignment strategy is provided for a total number of fifty available rake fingers for use in detecting data symbols from ten users. For each user the relative signal strength is determined by the signals strength estimation means 26, after the correlating filter effected by the rake fingers 24', for all of the temporal displacements determined from the channel impulse response corresponding to each user. The fifty strongest paths are then selected from the total of all users. The rake fingers are thereafter assigned in accordance with a relative strength of the detected data symbols and this assignment changes from iteration to iteration. Initially users with weak signals are not assigned rake fingers, since there is a possibility that detection of this data before interference cancellation may result in a very low probability of estimating the symbol correctly. For the final few iterations of the detection process, users with weak signals are then assigned a greater number of the rake fingers so as to provide a greater likelihood of detection.

A more advanced strategy, based on the total received wanted carrier signal power to interference power ratio is also possible. For this purpose the interference effect of admitting a specific path must be estimated, including the effect of the correlation factors.

As will be appreciated by those skilled in the art various modifications may be made to the embodiments herein before described without departing from the scope of the present invention. For example, the receiver may be used to detect TD/CDMA signals as well as other forms of CDMA radio access signals. In this case the rake fingers 24, 24', will be replaced by other forms of a data detector such as those disclosed in our co-pending

What is claimed is:

1. A receiver for recovering data for at least one of a plurality of users from radio signals associated with the plurality of users, the receiver comprising:
    data detectors, each of the data detectors being associated with one of a plurality of temporal displacements of communications paths through which the radio signals pass, each of the data detectors to estimate a user data symbol for one of the plurality of users from at least one of the radio signals;
    a signal strength estimator to estimate signal strengths of the radio signals; and
    a receiver controller to assign user codes and temporal displacements to the data detectors according to the signal strengths of the radio signals, the receiver controller assigning a first user code for a first user to a first number of data detectors and a second user code for a second user to a second number of data detectors, the first number of data detectors having different temporal displacements than the second number of data detectors.

2. The receiver of claim 1, wherein the first number of data detectors is greater than the second number of data detectors, and wherein a radio signal for the first user has a weaker signal strength than a radio signal for the second user.

3. The receiver of claim 1, wherein the first number of data detectors is greater than the second number of data detectors, and wherein a radio signal for the first user has a stronger signal strength than a radio signal for the second user.

4. The receiver of claim 1, further comprising:
    a combiner to combine estimated user data symbols for the first user to form a composite symbol.

5. The receiver of claim 4, further comprising:
    a single processor that includes the combiner and the signal strength estimator, wherein the receiver controller controls the single processor.

6. The receiver of claim 1, further comprising a data store to store the radio signals, the radio signals being received within a pre-determined time window, wherein the radio signals are input to the data detectors from the data store under control of the receiver controller.

7. The receiver of claim 1, wherein the data detectors comprise rake fingers, the user codes comprise spreading codes, and the radio signals are generated in accordance with a code division multiple access (CDMA) process.

8. The receiver of claim 1, wherein the signal strength estimator re-estimates signal strengths of the radio signals at the temporal displacements, and the receiver controller re-assigns the user codes and the temporal displacements to the data detectors in accordance with re-estimated signal strengths of the radio signals.

9. The receiver of claim 1, further comprising:
    a signal re-generator coupled to the data detectors, the signal re-generator to re-generate a radio signal for the first user by combining an estimated user data symbol for the first user with one of the user codes.

10. The receiver of claim 9, wherein each of the data detectors comprises:
    subtracting means to subtract a regenerated radio signal from a corresponding radio signal prior to estimating a user data symbol.

11. A method of recovering data for at least one of a plurality of users from radio signals associated with the plurality of users, the method comprising:
    assigning, to each of plural data detectors, (i) one of a plurality of user codes, and (ii) one of a plurality of temporal displacements that correspond to communications paths through which the radio signals pass;
    estimating user data symbols using the data detectors and the radio signals;
    determining signal strengths of the radio signals; and
    re-assigning the plurality of user codes and the plurality of temporal displacements to the data detectors;
    wherein the re-assigning assigns a first user code for a first user to a first number of data detectors and a second user code for a second user to a second number of data detectors, the first number of data detectors having different temporal displacements than the second number of data detectors.

12. The method of claim 11, wherein the first number of data detectors is greater than the second number of data detectors, and a radio signal for the first user has a weaker signal strength than a radio signal for the second user.

13. The method of claim 11, wherein the first number of data detectors is greater than the second number of data detectors, and a radio signal for the first user has a stronger signal strength than a radio signal for the second user.

14. The method of claim 11, further comprising combining estimated user data symbols for the first user to form a composite symbol.

15. The method of claim 11, further comprising:
    storing the radio signals, the radio signals being received within a pre-determined time window; and re-estimating user data symbols using stored radio signals and data detectors with re-assigned user codes and temporal displacements.

16. The method of claim 15, further comprising:
re-determining signal strengths of the stored radio signals; and
re-assigning user codes to the data detectors in accordance with signal strengths of the stored radio signals.

17. The method of claim 15, further comprising:
re-generating radio signals for the first user, wherein re-generating comprises combining estimated user data symbols with one of the reassigned user codes.

18. The method of claim 17, further comprising: subtracting the re-generated radio signals from corresponding radio signals prior to re-estimating the user data symbols.

19. The method of claim 11, wherein the data detectors comprise rake fingers and the user codes comprise spreading codes.

20. The method of claim 11, wherein the radio signals are generated in accordance with a code division multiple access process.

* * * * *